Dec. 20, 1932.  O. E. NELSON  1,891,570
TWIN PRESSURE VALVE
Filed April 15, 1932   3 Sheets-Sheet 3
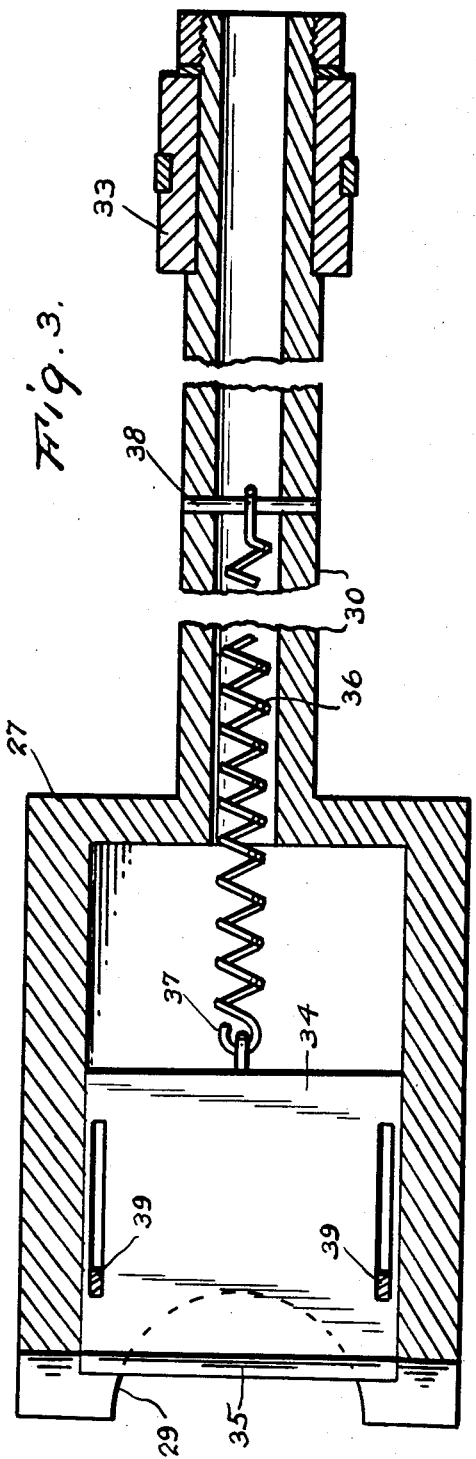
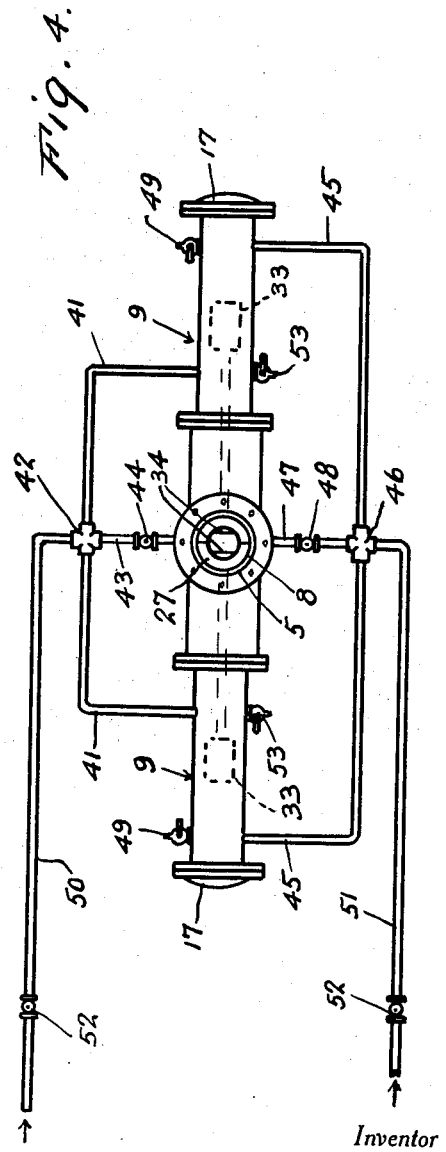
Inventor
O. E. Nelson
By Clarence A. O'Brien
Attorney Patented Dec. 20, 1932

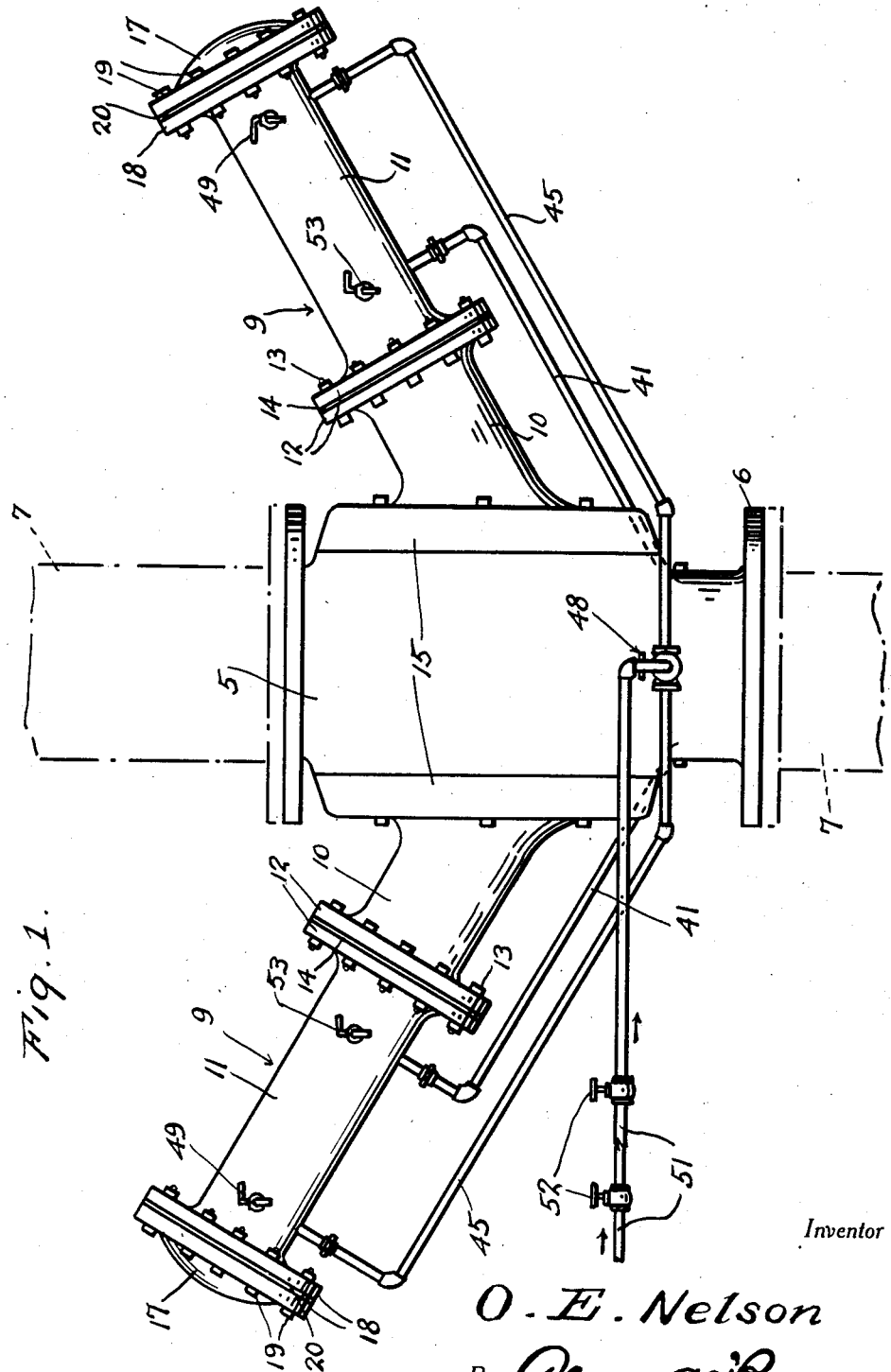

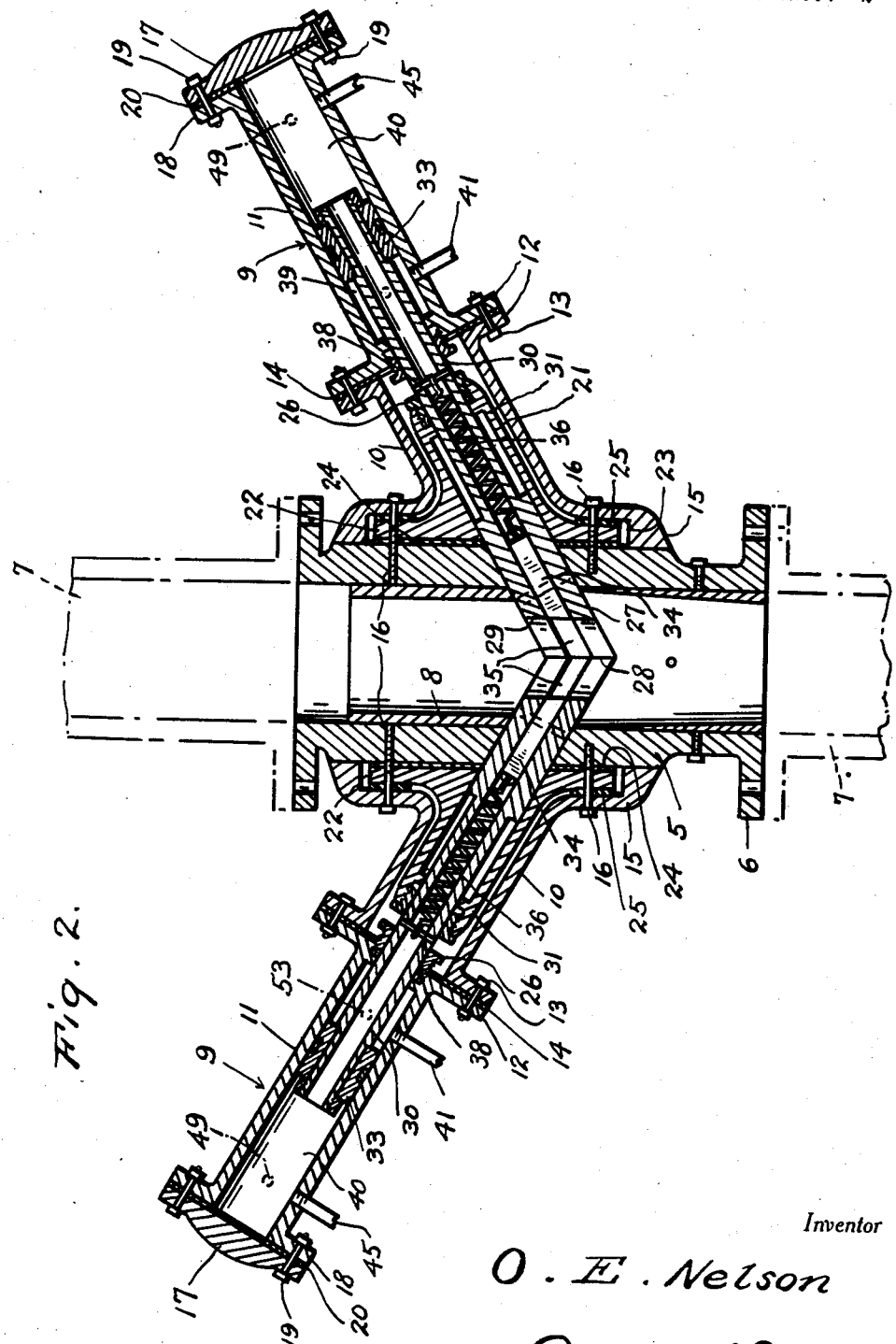

1,891,570

UNITED STATES PATENT OFFICE

ORVAL E. NELSON, OF CROSBY, TEXAS

TWIN PRESSURE VALVE

Application filed April 15, 1932. Serial No. 605,509.

This invention relates to valves, and in accordance with the present invention a valve is provided which is especially adapted for use on oil well casings as a protection against the dangers of possible oil well fires thus providing for a saving in the lives of workmen and of property.

Briefly the invention consists of a valve for controlling the discharge of the oil well and which can be operated automatically by pressure generated by the well when such pressure becomes excessive.

The invention together with its numerous objects and advantages will be best understood from a study of the following description, taken in connection with the accompanying drawings wherein:

Figure 1 is an elevational view of the valve, the same being shown as applied to a well casing.

Figure 2 is a sectional elevational view through the valve and

Figure 3 is a sectional elevational view through one of the valve members,

Figure 4 is a diagrammatic view of the device.

Referring more in detail to the drawings, the improved valve comprises a casing 5 provided at relatively opposite ends thereof with flanges 6 whereby said ends may be readily coupled to the proximate end of well casing sections as suggested in the drawings, these well casing sections being shown in broken lines designated by the reference character 7. The casing 5 is also provided with diametrically opposite openings 8, and in substantial alinement with these openings, outwardly and upwardly projecting cylindrical branches designated by the reference character 9.

Each of the branches comprises two substantially cylindrical sections 10, 11 provided with flanged ends 12 secured together through the medium of bolts 13, a washer 14 being interposed between the flanges.

The section 10 at its free end is provided with a flange or head 15 secured to the casing 5 through the medium of bolts or suitable fastening elements 16. The section 11 at its free end is provided with a flange, and a head or cap 17 is also provided for said end and is secured to the flange 18 through the medium of bolts or other similar fastening elements 19, a gasket 20 being interposed between the flange 18 and cap 17.

Arranged within each casing section 10 is a guide member 21 that is provided at one end with a head or flange 22 arranged within a recess 23 provided in the flange or head 15 and anchored in place through the medium of the bolts 16 which secure the head or flange to the casing 5. A washer 24 is interposed between the head or flange 22 in the proximate side of the casing 5, while a gasket 25 is interposed between the head or flange 22 and the inner wall of the recess or pocket 23. The relatively opposite end of the guide 21 is provided with a gland 26.

Arranged to reciprocate in the guide 21 is a non-circular outer hollow valve member 27, which has the edge thereof at one end beveled as at 28, and being also provided at said one edge with an arcuate or semi-circular notch 29. At its relatively opposite or inner end the valve member 27 is provided with a hollow or tubular valve stem 30 that extends through an annular guide 31 provided inwardly from the gland equipped end of the guide, and also through the gland 26, as well as through a gland 32 provided at that end of the section 11 coupled to the section 10. On its free end the stem 30 is provided with a piston 33 arranged to reciprocate within the section 11.

As shown in Figure 2 when the valve members 27 are projected inwardly of the casing 5, the beveled edges 28 of said valve members are in abutting relation, and the arcuate notches 29 form a circular recess to accommodate the well tubing string or tool as is apparent.

Arranged within each hollow valve member 27 is a non-circular valve member 34 opposite side edges of which operate in grooves 35 provided internally of the valve member 27. Each valve member 34 has its forward end edge thereof beveled as at 35, and said valve member 34 is normally retracted within its hollow valve member 27 through the medium of a coil spring 36 secured at one end as at 37 to the inner end of the valve member 34, and anchored at its relatively opposite end within the valve stem 30 through the medium of a transverse pin 38 (see Figure 3).

Sliding movement of the valve member 34 in both directions is limited through the medium of pin and slot means 39 as shown in Figure 3.

As is apparent from a study of Figure 2, when the valve members 34 are projected outwardly toward the beveled end of the valve members 27, the beveled ends 35 of said valve members 34 abut one with the other and the said valve members 34 in this projected position close the openings formed by the co-operating arcuate notches 29 thus positively shutting off the flow of the well.

As will be noted from a study of Figure 2, each piston 33 divides that valve casing section 11 in which the particular valve operates into substantially two chambers 39, 40 and the chambers 39 are connected with or in communication with the interior of the well casing through the medium of pipe conduits 41, which conduits 41 are connected together through the medium of a suitable pipe coupling 42, from one branch of which pipe coupling 42, a pipe 43 leads to one side of the casing 5; and said pipe 43 is provided with a manually controlled valve 44. The chambers or compartments 40 are connected with, or in communication with the interior of the well through the medium of pipe conduits 45 connected by a suitable pipe coupling 46 with a pipe 47 leading from a relatively opposite side of the casing 5 and equipped with a valve 48.

From the above, it is apparent, that with valve 44 closed and valve 48 open, and each of the valve members 27, 34 in retracted or open positions, upon an excess of pressure in the well casing, pressure will be built up in the chambers 40, and will act on the piston 43 for moving the valve members 27 to the position shown in Figure 2; and with the several edges 28 and the valve members 27 in abutting relation the pressure will then act on the members 34 against the action of springs 36 to project said valve members 34 inwardly toward one another whereby the ends 35 of the valve members will be moved to abutting relation, and the opening formed by the notches 29 closed by the abutting valve members 34, with the result that the flow of the well will be positively checked.

Also, with valve 48 closed and valve 44 open, and valve members 27 and 34 in their projected or well closing position, a retraction of said valve members may be accomplished by venting the chambers 40 through the medium of relief valves 49 provided for that purpose so that as pressure is reduced in the chambers 40, pressure will be built up in the chambers 39 to thereby act on the pistons 33 for moving them toward the outer free end of the branches 9, resulting in a retraction of the hollow valve member 27; obviously as the pressure is released in the chambers 40 the valve members 34 under action of the springs 36 will return to their normal retracted position within the valve members 27.

The opening and closing of the valve may also be accomplished by pressure supplied from an outside source, and to this end, pressure lines 50, 51, leading from a suitable source of supply are connected with the pipe couplings 42, 46, and each of these lines 50, 51 is provided with a control valve 52. It is thought obvious that to utilize pressure from an outside source to close the valve, valve 48 is closed and valve 52 of line 51 opened whereby pressure is supplied from said outside source to the chambers 40 through the line 51 and lines 45, it being understood of course that vents 53 similar to vents 49 are provided for the chambers 39. To open the valve, valve 44 is closed, while valve 52 of line 50 is open so that the pressure is supplied to the chambers 39 to the line 50 and the lines 41.

It is thought that from the foregoing description, taken in connection with the accompanying drawings, that a clear understanding of the operation, construction, utility and advantages of a valve of this character will be had by those skilled in the art without a more detailed description.

It is also to be understood that while I have herein shown and described the preferred embodiment of the invention, that I in no wise intend to restrict the invention beyond the requirements of the prior art and the scope of the appended claims.

Having thus described my invention, what I claim as new is:

1. A safety valve for oil wells and the like comprising a casing adapted to be secured to the well casing in alinement therewith and provided with diametrically opposed openings, outwardly projecting upwardly inclined cylinders alined with said openings, a fixed guide in one end of each cylinder, an outer hollow valve plunger arranged to reciprocate in each of the guides, a hollow valve stem connected with each plunger and opened at its ends, a piston on each stem, an inner valve plunger slidable in each of said hollow plungers, elastic means normally retaining each inner plunger retracted, and valved conduits connecting the cylinders on relatively opposite sides of the respective pistons with the casing and with an outside source of pressure supply.

2. A safety valve for oil wells and the like comprising a casing adapted to be secured to the well casing in alinement therewith and provided with diametrically opposed openings, outwardly projecting upwardly inclined cylinders alined with said openings, a fixed guide at one end of each cylinder, a valve plunger arranged to reciprocate in each guide, a piston arranged to reciprocate in each cylinder being connected with a valve plunger for shifting it, and means to simultaneously reciprocate the pistons for moving the valve plungers into and out of said casing.

3. A safety valve for oil wells comprising a tubular casing having oppositely inclined tubular branches extending from diametrically opposite sides thereof, a non-circular guide member in each of said branches, an outer hollow valve plunger slidably arranged in each guide and having an arcuately notched end projectable into the casing, an inner valve plunger slidable in each of the outer valve plungers, spring means normally retaining each inner valve plunger retracted, and valved conduits connecting the branches with the casing and with a source of fluid pressure supply whereby fluid pressure from said source of pressure supply may be used for projecting and retracting the inner and outer valve plungers.

4. A valve comprising in combination, a casing having a passage therethrough, oppositely slidable valve plungers controlling said passage and respectively including inner and outer slidable members, and spring means normally retaining the inner members retracted within their respective outer members.

In testimony whereof I affix my signature.

ORVAL E. NELSON.